Figure 1:
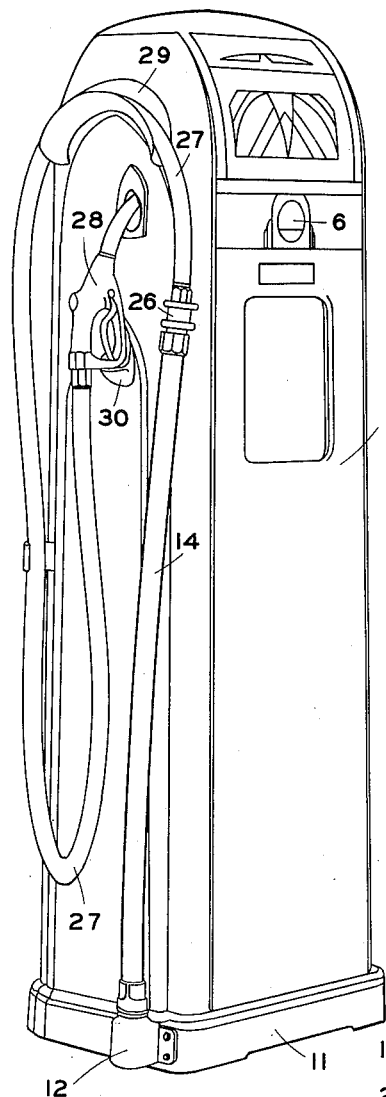

Aug. 5, 1941.    F. W. MOORE    2,251,340
EXTENSIBLE DELIVERY DEVICE
Filed April 11, 1940

INVENTOR
FRED W. MOORE
BY
HIS ATTORNEY

Patented Aug. 5, 1941

2,251,340

UNITED STATES PATENT OFFICE 2,251,340

EXTENSIBLE DELIVERY DEVICE

Fred W. Moore, Cincinnati, Ohio, assignor to National Pumps Corporation, Dayton, Ohio, a corporation of Ohio Application April 11, 1940, Serial No. 329,085

5 Claims. (Cl. 221—95)

This invention relates to an extensible delivery device for liquid dispensing apparatus and is designed more particularly as an extensible delivery hose for gasoline pumps. In the ordinary gasoline pump the delivery hose is connected with the discharge line of the pump near the upper end of the pump cabinet and is usually approximately ten feet in length. This length enables delivery to be made to any automobile which is properly located with relation to the pump but definitely limits the distance which the filling opening of the gasoline tank of the automobile is located from the pump. It is not practical to use longer hose because of its weight and the difficulty in handling the same and also because such excessive length would cause the hose to drag over the ground or cement pavement during ordinary delivery operations in such a manner as to cause excessive wear on the hose. It has been proposed heretofore to render the delivery hose extensible in various ways, as by means of a reel on which the hose is wound or the use of weights to retract the hose. In such devices an extra long hose is of course used and in making any delivery a pull must be exerted on the hose sufficient to unwind or extend the same, with the result that the hose is more or less cumbersome and difficult to handle. Further, in the event of injury to or excessive wear on any part of the hose, the hose as a whole must be discarded. In such arrangements the means for supporting the hose is usually arranged in the pump cabinet which is objectionable not only because of the space required therefor but because it renders the supporting means inaccessible.

One object of the inventin is to provide an extensible delivery hose of such a character that it will be necessary to manipulate only the standard length of hose in making deliveries to properly placed automobiles but which may be extended to enable deliveries to be made to improperly placed automobiles.

A further object of the invention is to provide such an extensible delivery hose all parts of which, and the support therefor, will be arranged exteriorly of the pump cabinet and will be readily accessible, and in which a worn or injured part may be replaced without replacing the entire delivery hose.

A further object of the invention is to provide an extensible delivery hose of such a character and so supported that there will be no likelihood of the hose kinking in such a manner as to injure the same.

A further object of the invention is to provide such a delivery hose in which the hose will not be coiled or otherwise distorted so as to reduce its capacity and expel a portion of the gasoline therefrom after the nozzle has been closed.

A further object of the invention is to provide such an extensible delivery device which will be simple in construction, easily installed and can be produced at a low cost.

Other objects of the invention may appear as the device is described in detail.

Figure 2:
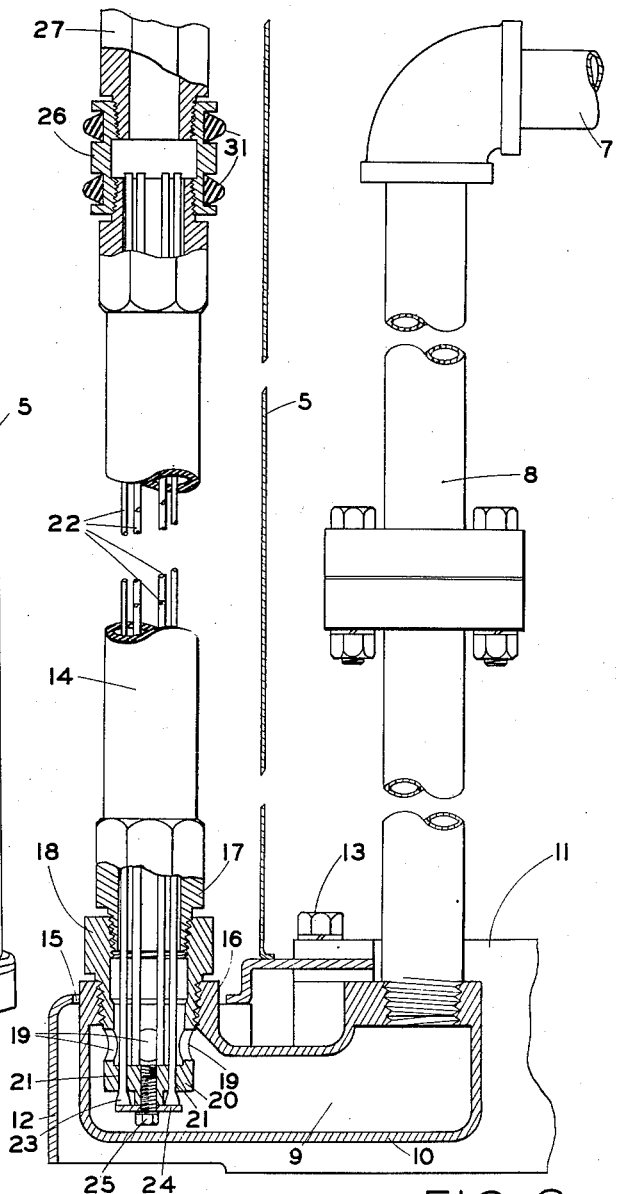
Figure 3:
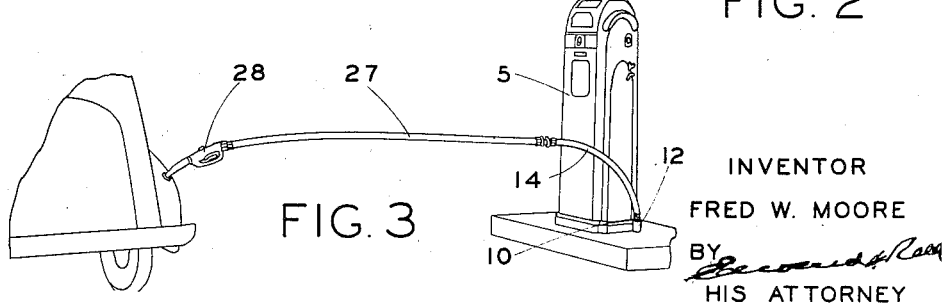

In the accompanying drawing Fig. 1 is a perspective view of a gasoline pump equipped with my extensible delivery hose; Fig. 2 is an elevation partly in section and partly broken away of portions of the extensible device and the means for connecting the same with the discharge line of the pump; and Fig. 3 is a perspective view of the pump showing the delivery hose in its extended position.

In this drawing I have, for the purpose of illustration, shown what is now the preferred embodiment of the invention and have shown the same as applied to a gasoline pump of a well known character. It will be understood, however, that the device may take various forms and may be used in connection with dispensing apparatus of various kinds without departing from the spirit of the invention.

In carrying out my invention I connect with the discharge line of the pump an upright flexible tube the lower end of which is fixedly mounted near the lower end of the pump cabinet and which is yieldably retained normally in a substantially vertical position. The usual or standard delivery hose is connected with the upper or discharge end of this tube and may be manipulated in making ordinary deliveries without substantial flexure of the upright tube, but in making a delivery at an excessive distance from the pump the tube may be flexed to increase the distance from the pump at which the delivery may be made. In the particular embodiment illustrated the gasoline pump as a whole comprises a cabinet 5 within which is located the usual motor driven pump, meter and discharge line. The discharge line usually passes through a flow or level indicator, as shown at 6, and is connected with the delivery hose at a point near the top of the cabinet. In Fig. 2 a portion of the discharge line is shown at 7 and the laterally extending pipe forming a part of the discharge line is terminated within the cabinet 5 and has connected therewith a downwardly extending pipe 8, which forms a part of the discharge line and which is connected at its lower end with the inner end of a conduit 9, the outer end of which is arranged exteriorly of the cabinet. As here shown, the conduit 9 is formed in a fitting 10 which is mounted in the base 11 of the cabinet and extends beneath the adjacent wall 5 of the cabinet to the exterior of the latter, the base being preferably provided with an offset portion 12 on the exterior of the cabinet wall to receive the outer end of the fitting. The fitting is rigidly secured in the base, as by means of screws, one of which is shown at 13.

Connected with the outer end of the conduit 9 is a flexible tube 14 preferably in the form of a section of gasoline hose of a diameter slightly greater than the diameter of the standard hose. The lower end of this tube may be secured to the conduit 9, or fitting 10, in any suitable manner. As here shown, the base extension 12 is provided in its top with an opening 15 and the outer end portion 16 of the fitting 10 extends upwardly through that opening. The tube, or extension, 14, is provided at its lower end with a coupling member 17 which is screw threaded into the upper end of an adapter 18 which in turn is screw threaded into the upwardly projecting outer end 16 of the fitting 10. The lower end of the adapter extends into the conduit and is provided with lateral ports 19 through which the liquid may flow from the conduit through the adapter to the tube. The lower end of the adapter below the openings 19 is closed by a transverse wall 20 which is provided with a plurality of openings 21, the purpose of which will hereinafter appear.

The tube or extension 14 is retained normally in a substantially upright position by a resilient device which may be of any suitable character and preferably it is in the nature of an elongate resilient device arranged within the tube and having its lower end rigidly mounted near the bottom of the tube. In order that the resilient device may have the desired flexibility and at the same time have sufficient strength to support the tube normally in an upright position I prefer to utilize a plurality of rods 22 of small diameter which are anchored near the bottom of the tube and extend through the same to points near the upper end thereof. In the present instance, I have employed six rods which are of uniform length but any suitable number of rods may be used and it is not essential that they should all be of the same length. The rods may be mounted in any suitable manner and, in the present instance, the lower portions thereof extend through the openings 21 in the bottom of the adapter 18 and are flattened, as shown at 23, to hold them against upward movement with relation to the adapter. They are supported against downward movement by a plate 24 arranged beneath the flattened ends thereof and secured to the adapter by a screw 25. Thus the rods are rigidly supported but have no fixed connection with the tube 14, the latter being capable of moving with relation to the rods and the rods being capable of moving laterally with relation one to the other when the tube is flexed. Connected with the upper end of the tube 14 by a coupling 26 is the usual delivery hose 27, of standard length, which is provided at its outer end with the usual nozzle 28. When the dispensing apparatus is idle, that is, between delivery operations, the extension tube 14 is in a substantially vertical position and the hose 27 is looped over and supported by a bracket 29 on the side wall of the cabinet and the nozzle is supported on the usual bracket 30, that portion of the hose between the brackets 29 and 30 hanging in loop form. To prevent the coupling 26 from contacting with and marring the wall of the cabinet it may be provided with buffer rings 31 of rubber or other suitable material. When a delivery is to be made the hose 27 is removed from its supporting brackets and if the automobile is properly placed with relation to the pump this delivery may be made at any point within the length of the hose in the usual manner without flexing the tube 14, thus requiring the operator to handle and manipulate only the standard length of hose. If the automobile is placed such a distance from the pump that it cannot be reached by the standard length of hose a slight pull on the hose will flex the tube 14 and permit the delivery to be made at an increased distance from the pump, as shown in Fig. 3. The flexing of the tube 14 requires little effort on the part of the operator and can be effected by the hand which grasps the nozzle, without the necessity of using the other hand to pull on the hose. It will be noted that when flexed, as shown in Fig. 3, the end of the extension tube 14 projects a substantial distance beyond the side of the pump cabinet and, further, that when the tube is so flexed the point of connection of the standard hose 27 therewith is much lower than it is when the hose is connected with the pump in the usual manner, and therefore the flexing of the extension tube permits deliveries at a substantially increased distance from the pump. With the particular installation here shown this distance is increased approximately four feet.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. An extensible delivery device for a liquid dispensing apparatus having an outlet for liquid near its lower end, comprising a delivery hose, a normally upright flexible tube having means for connecting the same with said outlet and with the inlet end of said delivery hose, and a resilient device mounted on a fixed support near the lower end of said tube and extending lengthwise of said tube in supporting relation thereto, the resiliency of said device being such that it will retain said tube in a substantially upright position during the normal manipulation of said delivery hose but will yield and permit said tube to be flexed by the pull of said hose when the discharge end of the latter is in a position beyond the normal range of its operation.

2. An extensible delivery device for a liquid dispensing apparatus having an outlet for liquid near its lower end, comprising a delivery hose, a normally upright flexible tube having means for connecting the same with said outlet and with the inlet end of said delivery hose, and a resilient device mounted on a fixed support near the lower end of said tube and extending through said tube to a point adjacent the upper end of the latter and adapted to yieldably support said tube normally in an upright position.

3. An extensible delivery device for a liquid dispensing apparatus having an outlet for liquid near its lower end, comprising a delivery hose, a normally upright flexible tube having means for connecting the same with said outlet and with the inlet end of said delivery hose, and a plurality of resilient rods having their lower ends secured to a fixed support adjacent the lower end of said tube, extending through said tube in spaced relation one to the other to points adjacent the upper end of said tube and adapted to retain said tube in a substantially upright position during the manipulation of said delivery hose with the discharge end of the latter spaced laterally from said outlet a distance no greater than the length of said hose, and to permit the upper end of said tubular member to move downwardly and laterally with relation to said outlet when the discharge end of said hose is moved to a point spaced from said outlet a distance greater than the length of said hose.

4. An extensible delivery device for a liquid dispensing apparatus having an outlet for liquid near its lower end, comprising a delivery hose, a normally upright flexible tube having means for connecting the same with said outlet and with the inlet end of said delivery hose, a plurality of resilient rods extending through said tube for substantially the full length thereof, and means for rigidly securing said rods near their lower ends to a fixed support, the upper portions of said rods being capable of lateral movement with relation one to the other and with relation to said tube, the combined resiliency of said rods being such that they will support said tube in a substantially upright position during the manipulation of said hose within its normal range of operation and will permit said tube to be flexed by the pull of the hose when the discharge end of the latter is moved to a position beyond its normal range of operation.

5. In an extensible delivery device for liquid dispensing apparatus including a discharge pipe, a cabinet and a base, a fitting mounted in said base, extending laterally beyond the wall of said cabinet and connected at its inner end with said discharge pipe, an upwardly extending adapter mounted in said fitting exteriorly of said cabinet and having an inlet communicating with said fitting, a flexible tube connected with said adapter and extending upwardly therefrom, a delivery hose connected with the upper end of said tube, and a resilient device rigidly secured to said adapter, extending lengthwise of said tube in supporting relation thereto and adapted to retain the same in a substantially upright position during the normal manipulation of said delivery hose and to be flexed by the pull of said hose when the discharge end of the latter is moved to a position beyond the normal range of its operation.

FRED W. MOORE.